(12) United States Patent
Lavrentovich et al.

(10) Patent No.: US 9,324,473 B2
(45) Date of Patent: Apr. 26, 2016

(54) NANOPARTICLE COMPOSITION, A DEVICE AND A METHOD THEREOF

(75) Inventors: Oleg D. Lavrentovich, Kent, OH (US); Heung-Shik Park, Kent, OH (US)

(73) Assignee: KENT STATE UNIVERSITY, Kent, OH (US)

(*) Notice: Subject to any disclaimer, the term of this patent is extended or adjusted under 35 U.S.C. 154(b) by 1157 days.

(21) Appl. No.: 12/547,062

(22) Filed: Aug. 25, 2009

(65) Prior Publication Data
US 2010/0044650 A1 Feb. 25, 2010

Related U.S. Application Data

(60) Provisional application No. 61/190,014, filed on Aug. 25, 2008.

(51) Int. Cl.
| | |
|---|---|
| *H01B 1/22* | (2006.01) |
| *H01B 1/02* | (2006.01) |
| *B22F 1/00* | (2006.01) |
| *B82Y 30/00* | (2011.01) |

(52) U.S. Cl.
CPC ............... *H01B 1/22* (2013.01); *B22F 1/0022* (2013.01); *B22F 1/0025* (2013.01); *B82Y 30/00* (2013.01); *H01B 1/02* (2013.01)

(58) Field of Classification Search
USPC ................................................ 252/500, 514
See application file for complete search history.

(56) References Cited

U.S. PATENT DOCUMENTS

| | | | | |
|---|---|---|---|---|
| 2006/0110528 A1* | 5/2006 | Sahouani | .................. | 427/180 |
| 2007/0172582 A1* | 7/2007 | Mahoney et al. | ............ | 427/97.7 |
| 2007/0239256 A1* | 10/2007 | Weber et al. | .................. | 623/1.15 |
| 2008/0128761 A1* | 6/2008 | Banin et al. | .................... | 257/288 |
| 2009/0169807 A1* | 7/2009 | Yang et al. | ..................... | 428/119 |
| 2009/0326614 A1* | 12/2009 | El-Sayed et al. | ................. | 607/88 |
| 2010/0028543 A1* | 2/2010 | Davis et al. | ................ | 427/372.2 |

(Continued)

FOREIGN PATENT DOCUMENTS

WO    WO 2008/060268 A2 *  5/2008

OTHER PUBLICATIONS

Dujardin, et al. "DNA-Driven Self-Assembly of Gold Nanorods", Chem. Commun., 2001, pp. 1264-1265.*

(Continued)

*Primary Examiner* — Lorna M Douyon
(74) *Attorney, Agent, or Firm* — Fay Sharpe LLP

(57) ABSTRACT

A nanoparticle composition, a device including the nanoparticle composition, and a method thereof are provided. The composition comprises nanoparticles such as Gold nanorods (NR) and electrically charged self-assembled molecular aggregates such as disodium chromoglycate (DSCG) in a common solvent such as water. The nanoparticles are assembled as, for example, side-by-side and end-to-end assemblies of nanorods, through a non-covalent interaction such as anisotropic electrostatic interaction with the electrically charged self-assembled molecular aggregates. The invention can be used in a cloaking device, a biological sensing device, a drug delivery, a meta material, a negative index material, an enhanced imaging device, and a device for solar energy conversion, and exhibits many merits such as simpler process without the need of a covalent bonding between the nanoparticles, different manners of nanoparticles assembling with same linker, higher thermal stability, cost effectiveness, and capability of gradual controlling of the degree of NR assembly, among others.

23 Claims, 15 Drawing Sheets

(56) References Cited

U.S. PATENT DOCUMENTS

2010/0092372 A1* 4/2010 Mirkin et al. .................. 423/491
2010/0104645 A1* 4/2010 Ali et al. ........................ 424/489
2012/0164717 A1* 6/2012 Irudayaraj ................... 435/287.2

OTHER PUBLICATIONS

Lim et al. "Adsorption of Cyanine Dyes on Gold Nanoparticles and Formation of J-Aggregates in the Nanoparticle Assembly", J. Phys. Chem. B, 2006, vol. 110, pp. 6673-6682.*

Hotchkiss, et al. "Surface Modification of Gold Nanorods with Polymers Synthesized by Reversible Addition-Fragmentation Chain Transfer Polymerization", Chem. Mater, 2007, vol. 19, pp. 6-13.*

Caswell et al., "Preferential End-to-End Assembly of Gold Nanorods by Biotin-Streptavidin Connectors," JACS, 2003, vol. 125, pp. 13914-13915.*

Murphy et al., "Anisotropic Metal Nanoparticles: Synthesis, Assembly, and Optical Applications," J. Phys. Chem., 2005, vol. 109, pp. 13857-13870.*

Nie et al., ""Supramolecular" Assembly of Gold Nanorods End-Terminated with Polymer "Pom-Poms": Effect of Pom-Pom Structure on the Association Modes," JACS, 2008, vol. 130, pp. 3683-3689.*

\* cited by examiner

NANOPARTICLE COMPOSITION, A DEVICE AND A METHOD THEREOF

This application claims priority based on the U.S. Provisional Application 61/190,014 filed on Aug. 25, 2008, which is incorporated herein by reference in its entirety.

This invention was made with United States Government Support under Grant No. FA9550-06-1-0337 from the Air Force Office of Scientific Research, Multidisiplinary University Research Initiative; Grant No. DMR-0504516 from the W. Keck Foundation, National Science Foundation; Grant No. N00014-06-1-0473 from the Office of Naval Research; Grant Nos. GRT00008581/RF60012388 and FA9550-05-1-043 from the Air Force Office of Scientific Research; and Grant No. CMS-0528867 from the National Science Foundation. The United States Government has certain rights in this invention.

BACKGROUND OF THE INVENTION

The present invention is related to a nanoparticle composition, a device including the nanoparticle composition, and a method thereof. It finds particular application in conjunction with a cloaking device, a biological sensing device, a drug delivery device, a meta material, a negative index material, an enhanced imaging device, and a device for solar energy conversion; and will be described with particular reference thereto. However, it is to be appreciated that the present exemplary embodiments are also amenable to other like applications.

Understanding and controlling the collective behavior of nanoparticles (NPs) is a challenging task of fundamental and practical importance. This is particularly true for nanorods (NRs) since their anisotropy implies additional functionality at the scale of individual particles and at the scale of their assemblies, which enable a variety of applications, from cloaking devices to biological sensing and solar energy conversion.

One approach for NR assembly is disclosed in B. Nikoobakht, Z. L. Wang, M. A. El-Sayed, J. Phys. Chem. B 2000, 104, 8635; and N. R. Jana, Angew. Chem. Int. Ed. 2004, 43, 1536. The approach reported therein relies on the Onsager (excluded volume) mechanism, driving parallel alignment of NRs when their volume fraction Φ and their aspect ratio are high enough. Another approach utilizes anisotropic attractive forces and thus can produce assembled structures at practically any concentration of NRs. For example, K. K. Caswell et al. disclose an end-to-end assembly of NRs with covalently bound biotin connected into chains by streptavidin (K. K. Caswell, J. N. Wilson, U. H. F. Bunz, C. J. Murphy, J. Am. Chem. Soc. 2003, 125, 13914). E. Dujardin et al. taught a side-by-side assembly of NRs with an oppositely charged B-DNA (E. Dujardin, L.-B. Hsin, C. R. C. Wang, S. Mann, Chem. Commun. 2001, 1264). Side-by-side assembly of NRs based on hydrophobic/hydrophilic interactions is disclosed in Z. Nie, D. Fava, E. Kumacheva, S. Zou, G. C. Walker, M. Rubinstein, Nature Mater. 2007, 6, 609; and B. P. Khanal, E. R. Zubarev, Angew. Chem. Int. Ed. 2007, 46, 2195.

Advantageously, this invention provides a nanoparticle composition, a device including the nanoparticle composition, and a method for making the same, which exhibit many merits such as a simplified process for achieving a desired geometry of nanoparticles assembly without the need of a covalent bonding between the nanoparticles, different manners of nanoparticles assembling with the same linker, higher thermal stability, cost effectiveness, and the capability to gradually control the degree of NR assembly, among others.

BRIEF DESCRIPTION OF THE INVENTION

One aspect of the invention provides a composition comprising nanoparticles and electrically charged self-assembled molecular aggregates, wherein said nanoparticles are assembled through an interaction with said electrically charged self-assembled molecular aggregates.

Another aspect of the invention provides a polymer composite comprising a polymer matrix, and assemblies of nanoparticles such as nanorods, wherein the assemblies of nanoparticles are dispersed in the polymer matrix.

Still another aspect of the invention provides a device including a composition which comprises nanoparticles and electrically charged self-assembled molecular aggregates, wherein said nanoparticles are assembled through an interaction with said electrically charged self-assembled molecular aggregates.

Still another aspect of the invention provides a method of assembling nanoparticles comprising using electrically charged self-assembled molecular aggregates to assembly the nanoparticles through an interaction between said electrically charged self-assembled molecular aggregates and said nanoparticles.

DETAILED DESCRIPTION OF THE INVENTION

Figure 1:
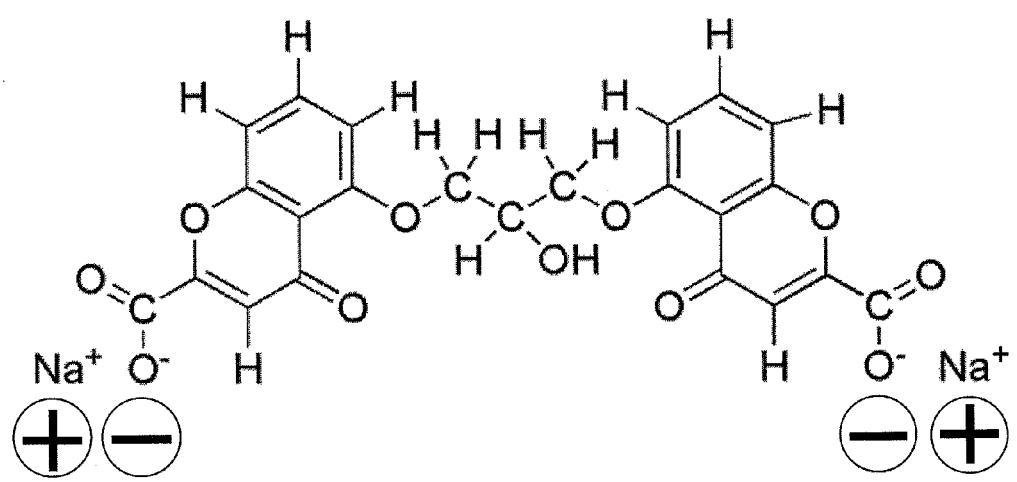
FIG. 1 shows the molecular structure of disodium chromoglycate (DSCG), which is used in electrically charged self-assembled molecular aggregates according to an embodiment of the invention.

Any particular theory that is used in the description, as an attempt to academically understand the mechanism of the invention, should not be interpreted as limitative of the scope of the invention.

The invention provides a composition comprising nanoparticles and electrically charged self-assembled molecular aggregates, wherein the nanoparticles are assembled through an interaction with the electrically charged self-assembled molecular aggregates. In various embodiments, the interaction is a non-covalent interaction, such as anisotropic electrostatic interaction. The invention utilizes anisotropic attractive forces and thus can produce assembled structures at practically any concentration of nanoparticles, such as nanorod (NR).

Typically, the nanoparticles of the invention have at least an anisotropic property, and are sometimes termed as anisotropic nanoparticles, a representative example of which is a nanorod. Nanorods are one morphology of nanoscale objects, each of which has a dimension ranging for example from 1 nm to 100 nm. They may be synthesized from metals or semiconducting materials. Standard aspect ratios (length divided by width) may be for example from about 3 to about 5. Nanorods may also be produced by direct chemical synthesis. A combination of ligands may act as shape control agents and bond to different facets of the nanorod with different strengths. This allows different faces of the nanorod to grow at different rates, producing an elongated object.

In specific embodiments, the nanorods of the invention comprise Gold (Au) nanorods.

Although there is no limitation on the relationship between the charge of the nanoparticles, such as nanorods, and the manner in which they are assembled, in some exemplary embodiments, the nanorods are positively charged and assemble in a side-by-side manner; while in other exemplary embodiments, the nanorods are negatively charged and assemble in an end-to-end manner.

The invention provides a simple and universal technique that uses a new type of a non-covalent "linker" to assemble the nanorods through anisotropic attractive forces either side-to-side or end-to-end, depending on the surface charge of the nanoparticles such as nanorods (NRs). Examples of these universal linkers include electrically charged self-assembled aggregates of lyotropic chromonic molecules.

According to the invention, the controlled non-covalent assembly of nanoparticles, such as metallic (gold) nanorods, is achieved by utilizing electrically charged self-assembled molecular aggregates, such as polyionic self-assembled stacks of organic chromonic molecules. Depending on the charge of the gold nanorods, the chromonic stacks assemble the nanorods in either a side-by-side or an end-to-end orientation through anisotropic attractive forces.

To make them negatively charged, the nanorods of the invention can be, for example, coated with an anionic compound. Examples of suitable anionic compounds include, but are not limited to, polyacrylic acid, polyacrylate, polystyrene sulfonic acid, polystyrene sulfonate, and the like, and any combination thereof.

In various embodiments, the electrically charged, self-assembled molecular aggregates can comprise lyotropic chromonic molecules. For example, the lyotropic chromonic molecule may have a disc-like shape and comprise a polyaromatic core and one or more ionizable groups at the periphery. Such lyotropic chromonic molecules may be self-assembled into a polydisperse stack.

In a specific embodiment, the lyotropic chromonic molecules comprise disodium chromoglycate (DSCG), also known as an antiasthmatic drug (common name "Intal"). FIG. 1 shows the molecular structure of DSCG, which is disc-like with a polyaromatic core and two ionizable groups at the periphery that make DSCG water soluble. DSCG molecules self-assemble into polydisperse stacks, being staked face-to-face to avoid contact with water. (J. E. Lydon, *Curr. Opin. Colloid Interface Sci.* 1988, 3, 458-466, *Curr. Opin. Colloid Interface Sci.* 2004, 8, 480-489).

In some embodiments, the invention provides a controllable side-by-side and end-to-end assembly of nanoparticles, such as Au nanorods, by using electrically charged self-assembled molecular aggregates such as lyotropic chromonic materials.

In embodiments, the resulting NR architecture has two levels of assembly. First, the chromonic linkers are anisotropically self-assembled into stacks and second, the NRs assemble into different oriented states through anisotropic electrostatic interactions with the chromonic linkers.

The invention provides a novel method of self-organization of nanoparticles, such as NRs, using a lyotropic chromonic material, such as DSCG, that self-assembles into charged stacks. These stacks serve as noncovalent universal linkers capable of side-by-side and end-to-end assembly. Among others, one advantage of the invention is that no covalent functionalization of the NRs is required. This simplifies the process and makes it more flexible. Second, both side-by-side and end-to-end geometries of assembly can be achieved using the same agent. When the NRs are charged positively, DSCG assembles them side-by-side. When the NRs are coated with polyacrylic acid to render a negative surface charge, DSCG assembles them end-to-end. Third, the chromonic materials, such as DSCG, can withstand temperatures much higher than the temperatures allowable for DNA and proteins, which is significant for many potential applications; and these materials are relatively cheap, as many of them are used in the food industry as colorants. Fourth, the organization in the NR superstructures is based on a fundamentally distinct approach in which the anisotropic electrostatic interactions are combined with the self-assembled nature of the linking elements. Fifth, the method of the invention enables gradual control of the degree of NR assembly via controlling the chromonic self-assembly by, for example, quenching the reaction by changing the concentration of DSCG, such as a dilution, or by changing the pH of the solution, such as by the addition of a base (e.g. NaOH) to increase the pH value. In an embodiment, the NR assembly reaction is quenched by the addition of a polyelectrolyte, such as poly(sodium styrenesulfonate).

EXAMPLES

With regard to the following examples, hexadecyltrimethylammonium bromide (CTAB), silver nitrate, ascorbic acid, sodium borohydride, gold (III) chloride, L-cystine, thioglycolic acid (TGA), polyacrylic acid (PAA) (Mol. Wt. 400,000), poly(sodium styrenesulfonate) (PSS) (mol. wt. 100,000), and poly(vinyl alcohol) (PVA) (mol. wt. 100,000) were purchased from Aldrich and used without further purification. Deionized water (Barnstead, E-pure system) was used in the preparation of solutions. TEM images were obtained using a JEOL JEM-100S electron microscope. TEM samples were prepared by dropping the mixture on a 300 mesh carbon coated copper grid and allowing the solvent to evaporate. The scale bars appearing on all of the TEM images (left corner on the bottom) represent 50 nm.

Dynamic light scattering (DLS) was performed using ALV/LSE-5004 with a He—Ne laser (maximal power 25 mW, power stability better than ±1% over 24 h, wavelength λ=632.8 nm). The intensity correlation functions were collected at several different scattering angles, from θ=15° to θ=100°. The size of the aggregates was estimated through measurement of the intensity correlation function of the scattered light that probed the dynamics of the system. The translation diffusion coefficient was determined as $$D = 1/\tau q^2,$$
$$\text{where } q = \frac{4\pi}{\lambda} n \sin\frac{\theta}{2},$$
$$n = 1.33$$

is the refractive index of water, and τ is a decay rate of the scattered light intensity correlation function. The effective size of the aggregate was deduced as the radius of an aggregate that was assumed to be spherical, by using the Stokes-Einstein equation.

Example 1

Side-by-Side Assembly

Gold NRs of average aspect ratio 3 (length 45 nm and diameter 15 nm) were synthesized by using the seed mediated growth method reported by B. Nikoobakht, M. A. El-Sayed, Chem. Mater. 2003, 15, 1957-1962. The experiments were then performed with these Au NRs coated with CTAB, which imparted a positive charge to the rods. A 20 ml solution of gold NRs was centrifuged twice and redispersed into a final volume of 1 ml of deionized water to remove excess CTAB stabilizer from the solution. The purified gold NRs had a bilayer of surfactant on the surface and a net positive charge (zeta potential+30 mV).

Figure 2:
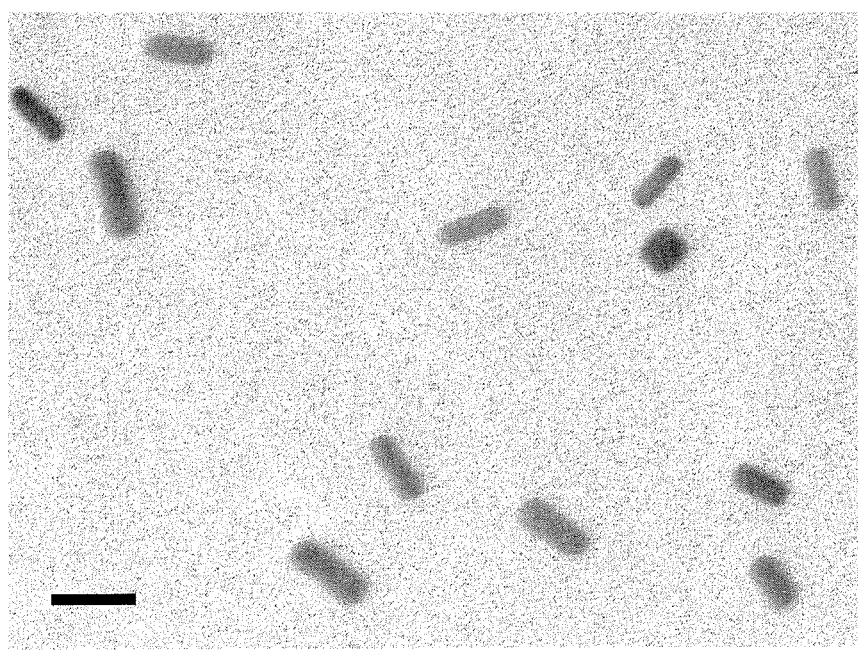
FIG. 2 shows the TEM image of a nanoparticle, such as a NR sample, as a control with no addition of electrically charged self-assembled molecular aggregates, such as DSCG.

In control samples with no DSCG added, no self-assembly was observed as the gold NRs repel each other. As shown in the TEM image of FIG. 2, the NRs appear isolated in the absence of DSCG.

Side-by-side self-assembly of Au NRs was induced by mixing a 0.8 mM DSCG solution mixed with 2 nM Au NR solution in water in a 1:1 ratio. 1 ml of DSCG solution in water was added to 1 ml of NR solution (concentration ~2 nM). Assembly was especially efficient for DSCG solution concentrations in the range 0.4 mM-0.8 mM (the aggregation rate increased with the concentration). The assembly was not detected if the DSCG concentration solution was low, ~0.1 mM or less; and at concentrations higher than 20 mM, the NRs form big clusters and precipitate.

Figure 3:
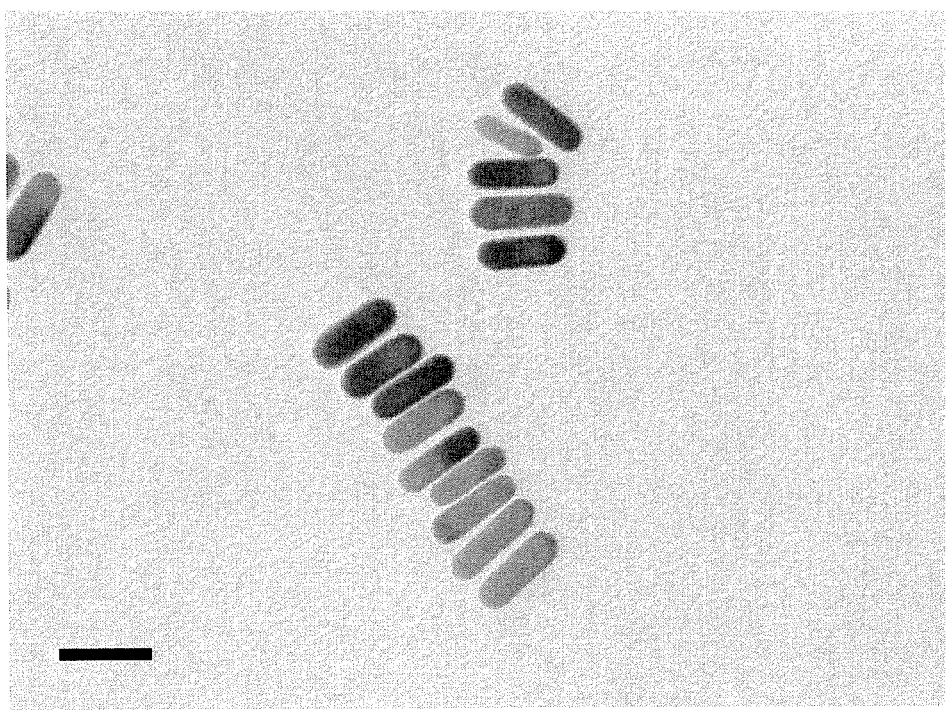
FIG. 3 shows the side-by-side assembly ("rafts") of NRs formed approximately 5 minutes after the addition of DSCG according to an embodiment of the invention.
Figure 6:
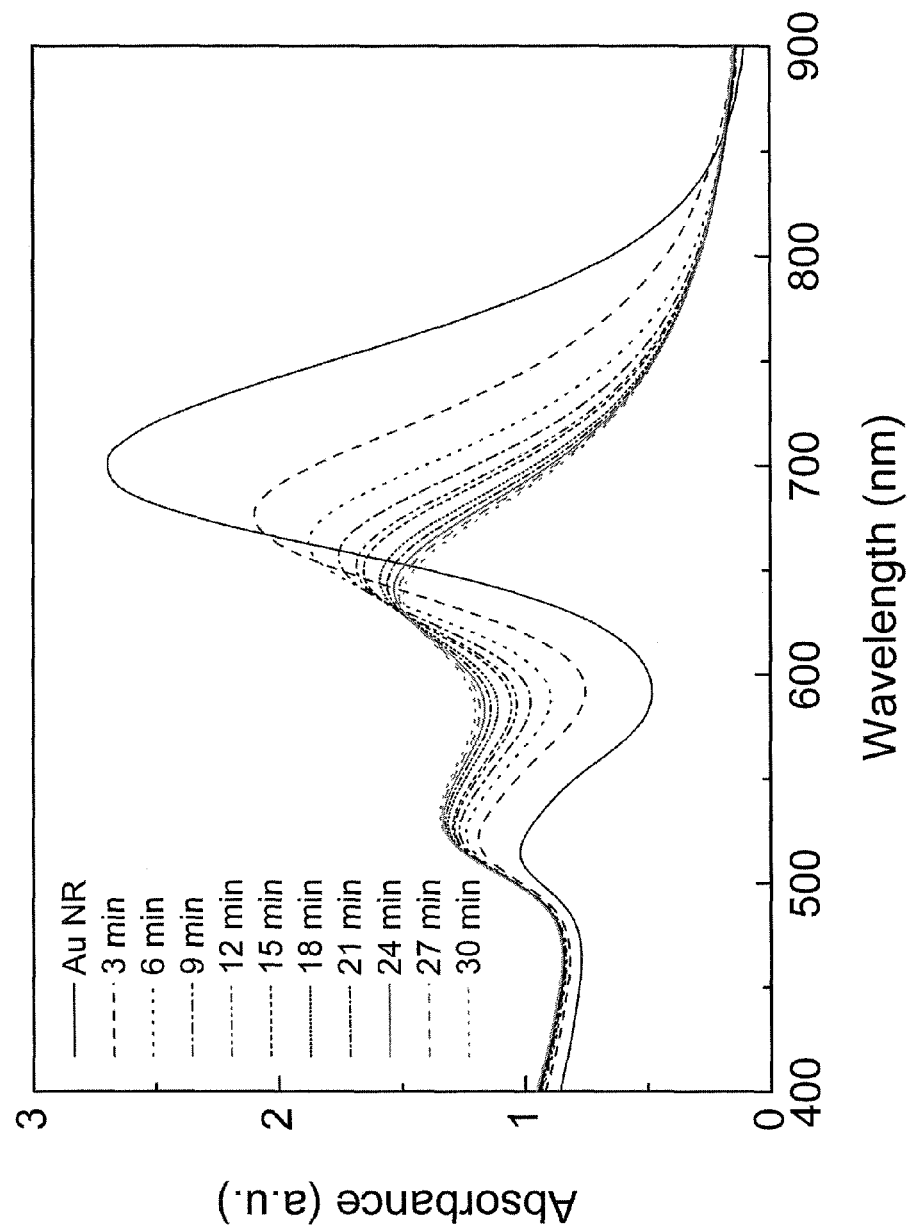
FIG. 6 shows the absorption spectra of Au NRs with hexadecyltrimethylammonium bromide (CTAB) coatings modified by the addition of DSCG as a function of time according to an embodiment of the invention.

The side-by-side attraction of NRs and their assembly started immediately when a sufficient amount of DSCG was added, as suggested by both TEM (FIG. 3) and light absorption data (FIG. 6). FIG. 3 shows the rafts of NRs formed approximately 5 min after the addition of DSCG. FIG. 6 shows the absorption spectra of 0.2 nM Au NRs with CTAB coatings modified by the addition of 0.5 mM DSCG, as a function of time. In FIG. 6, the longitudinal plasmon peak is blue shifted and the transverse plasmon peak is red shifted.

Figure 4:
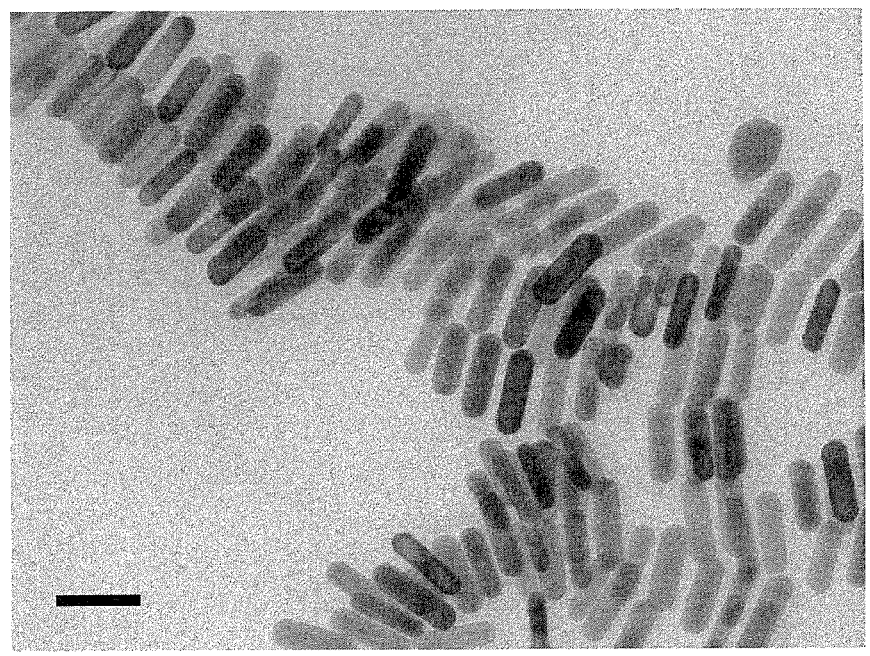
FIG. 4 shows side-by-side assemblies of NR formed about 15 min after the addition of DSCG according to an embodiment of the invention.

At the given concentration, the size of the assembled structures increases over time, as shown in FIGS. 3 and 4. FIG. 4 shows assemblies of NR formed about 15 min after the addition of DSCG. The NRs in the superstructures are parallel to and in registry with each other so that their ends are aligned fairly well along a common line. The superstructures resemble wooden rafts, with the width approximately equal to the length of a NR, and the thickness equal to the diameter of NR. Not observed was an "island" assembly in which the NR would be surrounded by more than two neighbors. However, as time progresses and the number of NR rafts increases, separate rafts might eventually overlap, as shown in FIG. 4.

Figure 7:
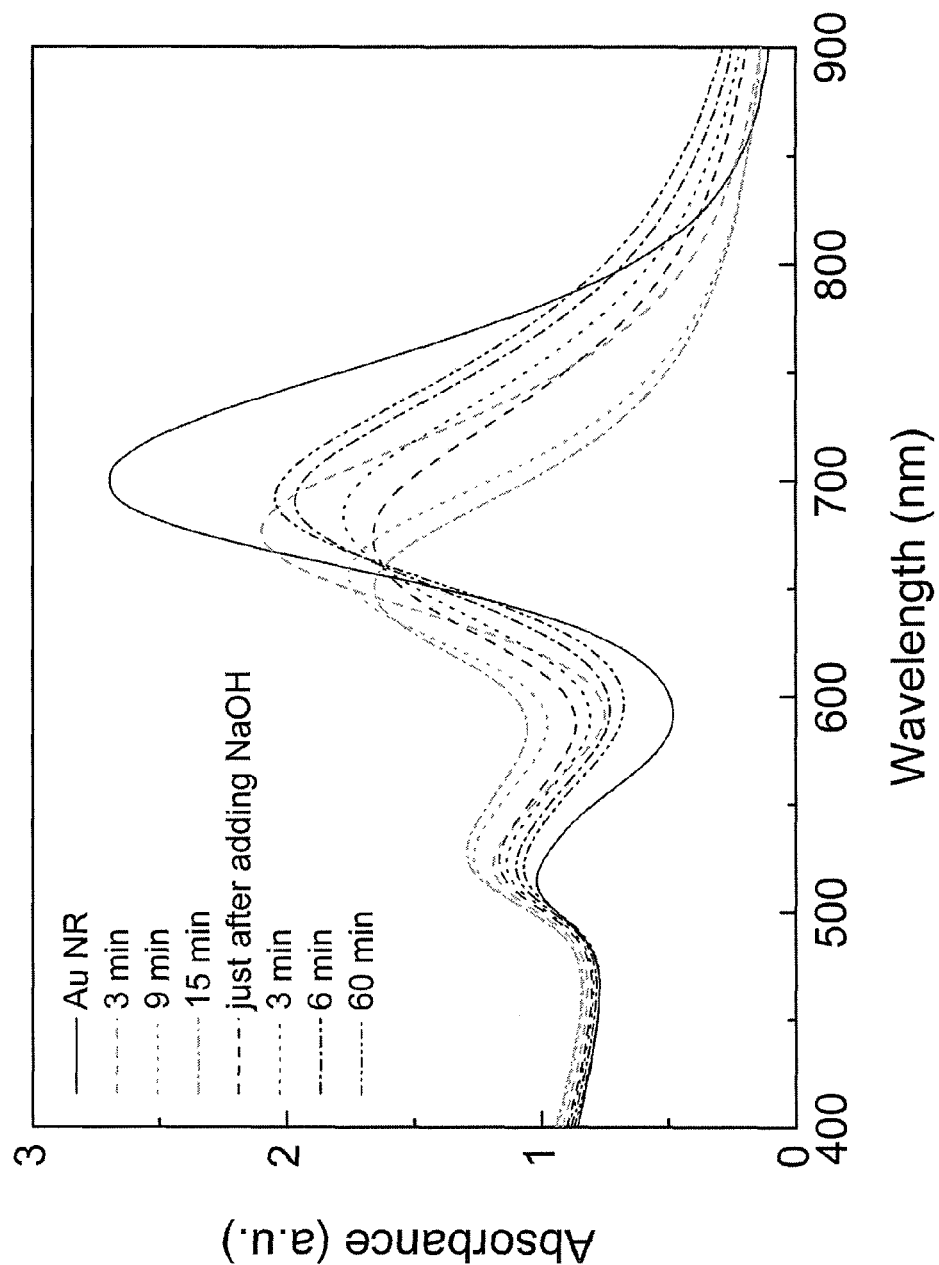
FIG. 7 shows the absorption spectra as a function of time of Au NRs with CTAB coatings modified by the addition of DSCG and then the addition of NaOH 15 minutes thereafter according to an embodiment of the invention.

In the TEM, the assembly might be an artifact of solvent evaporation. Further evidence of the side-to-side assembly is obtained by UV-visible spectroscopy as shown in FIGS. 6 and 7. FIG. 6 shows the absorption spectra of 0.2 nM Au NRs with CTAB coatings modified by the addition of 0.5 mM DSCG, as a function of time. In FIG. 6, the longitudinal plasmon peak is blue shifted and the transverse plasmon peak is red shifted. FIG. 7 shows the absorption spectra as a function of time of 0.2 nM Au NRs with CTAB coatings modified by the addition of 0.5 mM DSCG, and then addition of 8 µl of 0.5M NaOH 15 min after the addition of 0.5 mM DSCG. In FIG. 7, the longitudinal plasmon peak reverses its shift back to the longer wavelength and the transversal peak shifts back to the shorter wavelength. An isotropic solution of isolated gold NRs shows two absorption peaks associated with the oscillations of free electrons, a longitudinal and a transverse plasmon. The peaks' characteristics change when the NRs assemble. After the addition of DSCG (FIG. 6), the longitudinal peak experiences a strong blue shift (towards the shorter wavelengths) and decreases in amplitude. The transverse peak becomes red-shifted and increases in amplitude. These distinct changes qualitatively agree with the numerical simulations of model systems in known theories.

Figure 5:
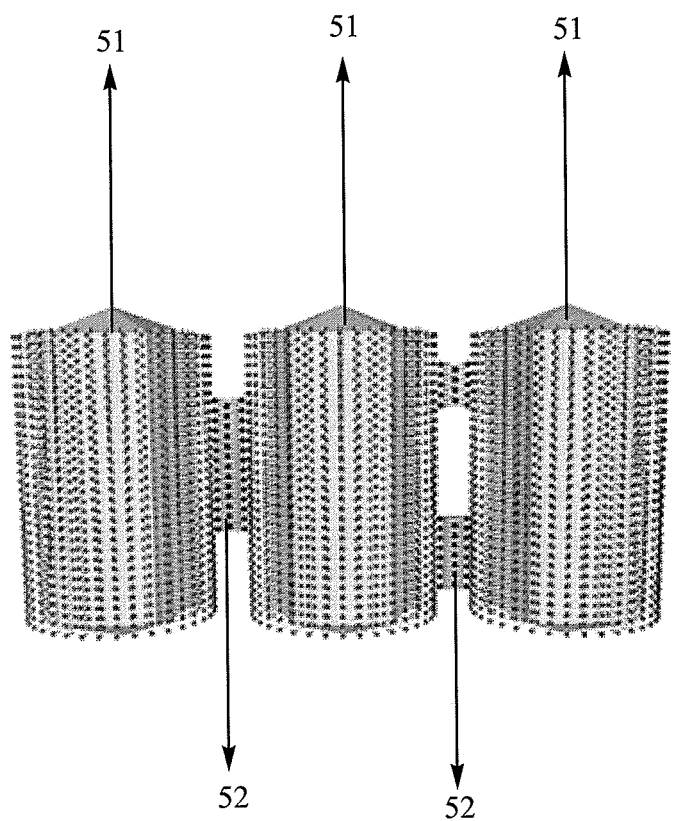
FIG. 5 schematically represents the side-by-side assembly of positively charged Au NRs mediated by negatively charged stacks of DSCG serving as self-assembled multivalent counter-ions according to an embodiment of the invention.

The observed side-by-side assembly cannot be caused by the Onsager mechanism, as the concentration of NRs is much lower than needed to satisfy the Onsager criterion, ΦL/d≥4. In the example, the length-to-diameter ratio is L/d≈3-5 for the used NRs, and Φ on the order of $10^{-5}$. The assembly may be explained by electrostatic attraction between negatively charged DSCG stacks and positively charged CTAB-stabilized NRs, as illustrated in FIG. 5. FIG. 5 schematically represents the side-by-side assembly of positively charged Au NRs 51 mediated by negatively charged stacks of DSCG 52 serving as self-assembled multivalent counter-ions. The affinity of CTAB to the lateral surface of NRs (corresponding to {110} and {100} facets) is higher than to the end facets {111} of the rod. As a result, the lateral surface is charged by CTAB stronger than the end facets. The DSCG stacks thus should be attracted to the lateral sides of NRs (and less so to their ends). This binding of DSCG is the ultimate reason for the mutual side-by-side attraction of Au NRs.

In the absence of DSCG, the NRs experience Coulomb repulsion which promotes their mutually perpendicular arrangements. In the presence of "linkers" such as multivalent counter-ions, the behavior of the electrically charged rods changes dramatically, as evidenced by a bulk of research on stiff polyelectrolytes such as DNA and F-actin. The competition between the long-range electrostatic repulsion and short-range attraction mediated by linkers often results in parallel assemblies and "condensation" of rods. For example, as predicted by Borukhov et al. (I. Borukhov, R. F. Bruinsma, W. M. Gelbart, A. J. Liu, *Proc. Nat. Acad. Sci.* 2005, 102, 3673-3678), linkers that absorb at the surface of the rods drive formation of bundles in which the rods are parallel to each other, connected by linkers, as in FIG. 5. The effect is predicted for concentration of rods that is much lower than the Onsager limit needed for the formation of the liquid crystalline phases of rods. Absence of side-by-side assembly at low concentrations of DSCG linkers is also in qualitative agreement with the model. Note that in the example, the rafts have a pronounced shape anisometry, being only one NR diameter thick, at least at the early stages of association. This shape might be simply an experimental artifact associated with the TEM sample preparation. However, a physical mechanism favoring rafts over islands of a larger thickness was pointed out. Since the DSCG stacks bound to the same rod should strongly repel each other, they might prefer to bind at the antipodal sides of the NR, thus triggering an assembly in which each NR has only two neighbors.

The average length of a stack such as DSCG stack in an isotropic solution is expected to depend on the volume fraction $\phi$ of DSCG and the "sticking" energy E, i.e., the energy gain associated with the placement of the molecule within the stack, as in the model of worm-like micelles.

$$\langle L \rangle \propto \sqrt{\phi} \exp \frac{E}{2k_B T} \quad (1)$$

In the isotropic solution, <L> is of the order of a few nanometers while the diameter of the stack is ~1.5 nm. As the repeat distance of stacking is 0.33 nm, the charge line density is high, in the range from ~6 e/nm (with one DSCG molecule in the cross-section) to 24 e/nm (with four molecules in the cross-section), the same as in B-DNA (6 e/nm) or even higher.

Although the chromonic stacks resemble the B-DNA duplexes geometrically and electrostatically, there is an important difference between them. In the chromonic stacks, there are no covalent bonds along the lateral surface to link the molecules and thus to fix the size of the stack; the latter can be controlled by temperature, ionic content of the solution, etc. The stacks thus represent self-assembled macroions with the ability to interact with other charged species, such as gold NRs.

An important feature of side-by side assembly is that it can be controlled by a number of factors influencing the self-assembly of DSCG itself, such as pH. Orendorff et al. (C. J. Orendorff, P. L. Hankins, C. J. Murphy, *Langmuir* 2005, 21, 2022-2026) reported that by adding an adipic acid whose charge depends on pH and evaporating the solvent to facilitate the Onsager type of alignment, one can assemble NRs into raft structures similar to those shown in FIGS. 3 and 4. For the exemplified system, an increased pH causes a different effect, a disassembly of the NRs as shown in FIG. 7. In the example, 2 nM solution of NRs and 0.5 mM solution of DSCG, in the proportion 1:1 were first mixed. 1 ml of the mixture was left for 15 min to allow the NR to assemble, after which time 8 μl of a 0.5 M solution of NaOH in water was added. While the NR-DSCG mixture demonstrated the shift of the longitudinal and transverse plasmon peaks towards each other, addition of NaOH reversed this trend (FIG. 7). A tentative explanation is that higher pH increases the negative charge of the DSCG molecules which decreases the energy E (because of the increased electrostatic repulsion of the DSCG molecules within the stacks) in Eq. (1). The DSCG stacks become shorter or disintegrate and are less capable of binding the NRs.

Example 2

End-to-End Assembly

This Example was conducted similarly to Example 1, except that, to make the gold NRs negatively charged, 100 μl of 1% polyacrylic acid (PAA) (Mol. Wt. 400,000) solution in water was slowly added to 1 ml of the purified gold nanorod solution under vigorous stirring. The negatively charged PAA was adsorbed onto the positively charged gold NRs by electrostatic attraction and the excess COOH groups provide a net negative charge to the rods (zeta potential −25 mV).

Figure 8:
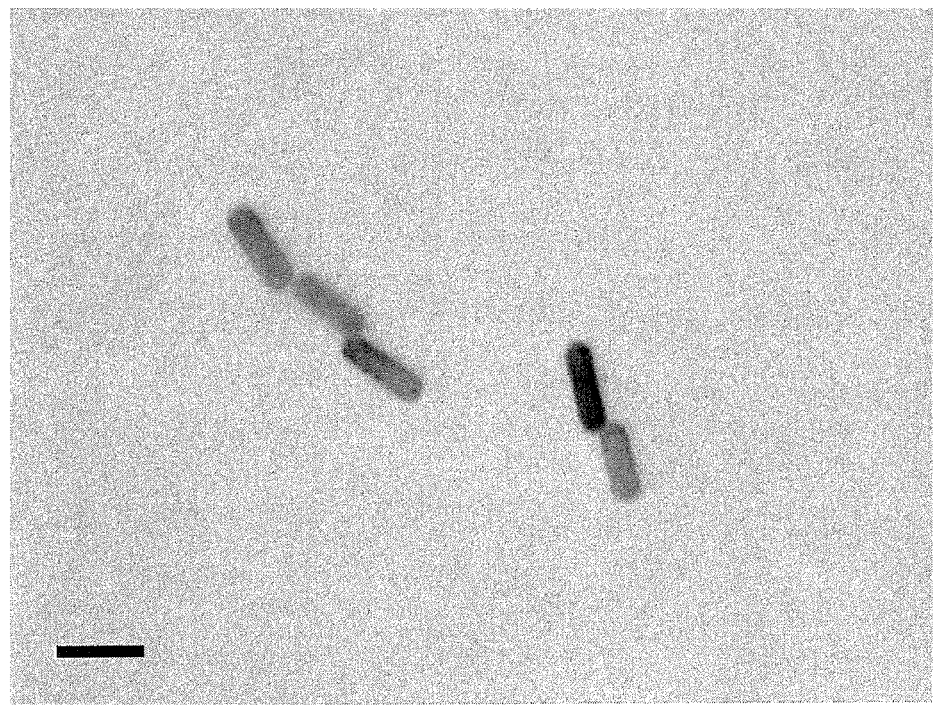
FIGS. 8 and 9 show the end-to-end self assembly of Au NRs with CTAB and polyacrylic acid (PAA) coatings induced by DSCG addition about 6 hours after the mixture preparation according to an embodiment of the invention.
Figure 9:
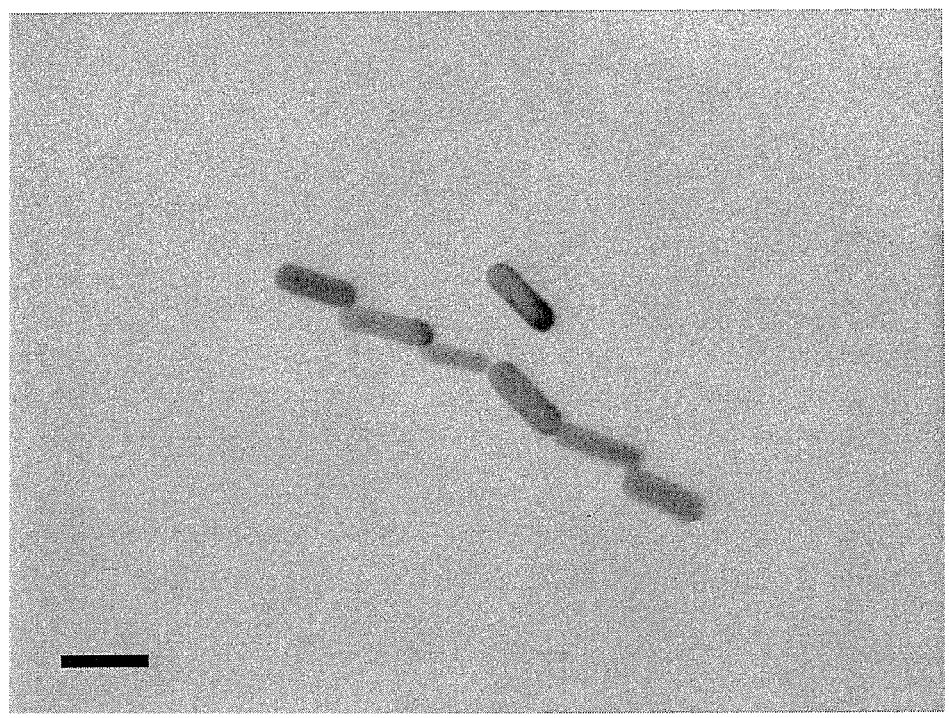
Figure 10:
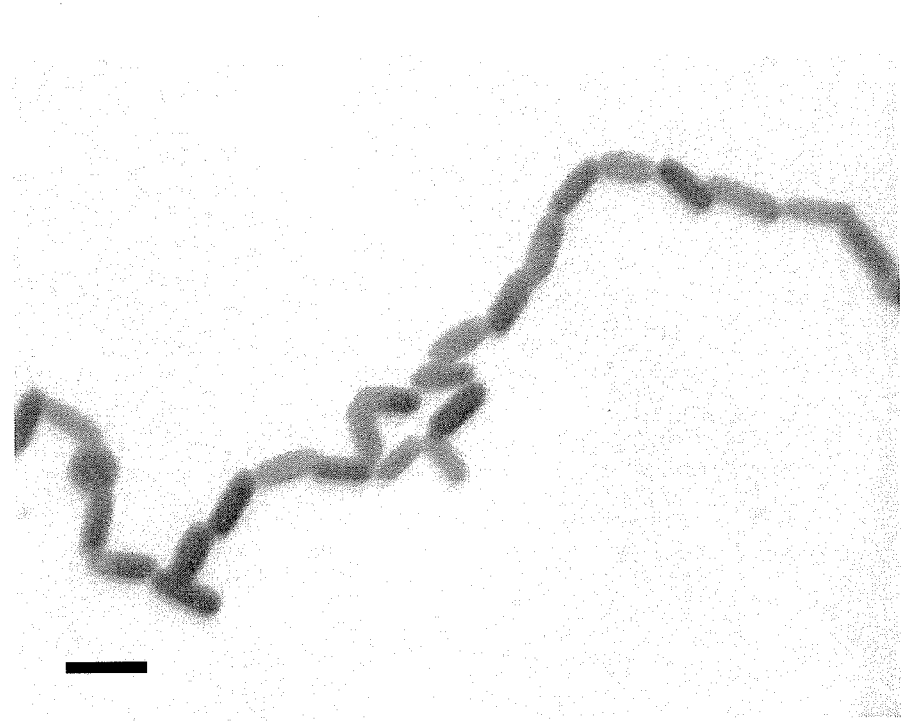
FIG. 10 shows the end-to-end self assembly of Au NRs with CTAB and PAA coatings induced by DSCG addition about 24 hours after the mixture preparation according to an embodiment of the invention.
Figure 11:
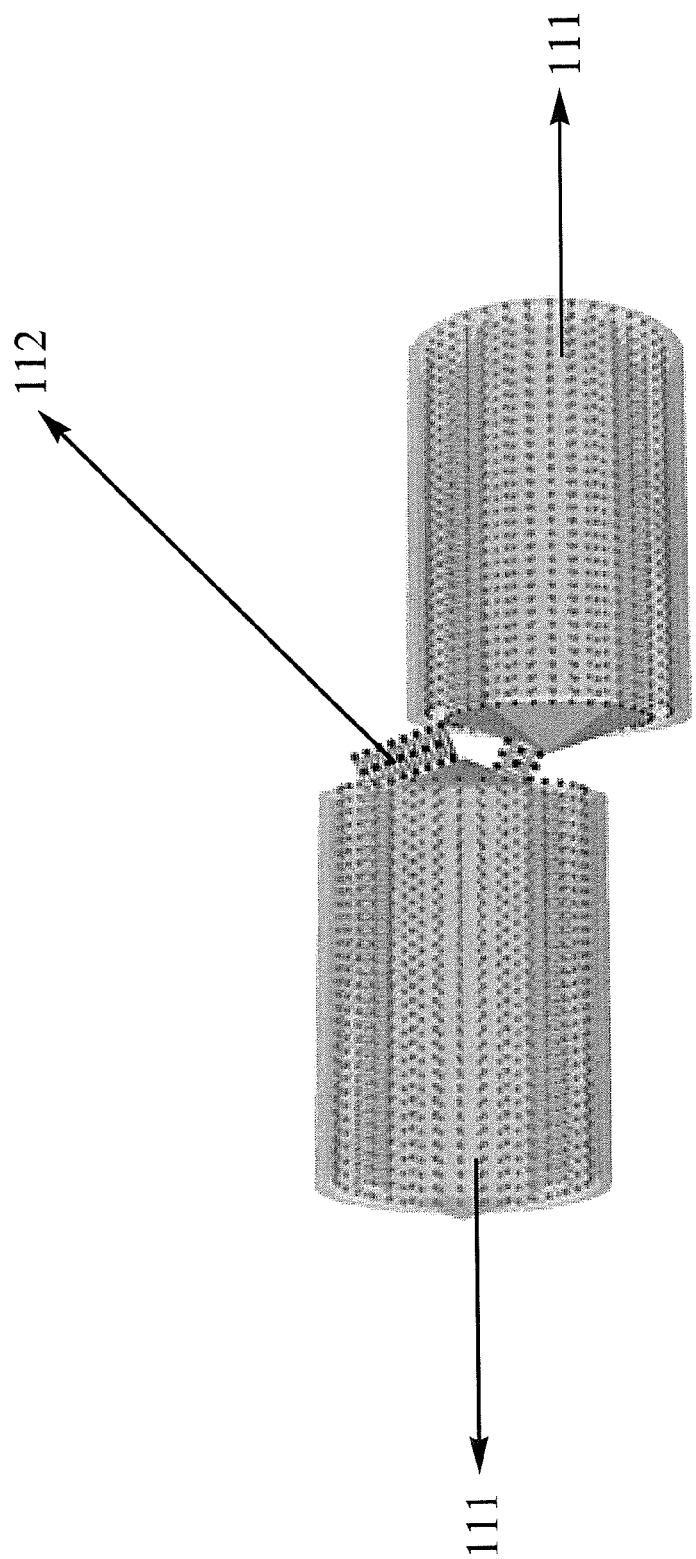
FIG. 11 schematically represents the end-to-end assembly of Au NRs with CTAB and PAA coatings induced by DSCG addition according to an embodiment of the invention.
Figure 12:
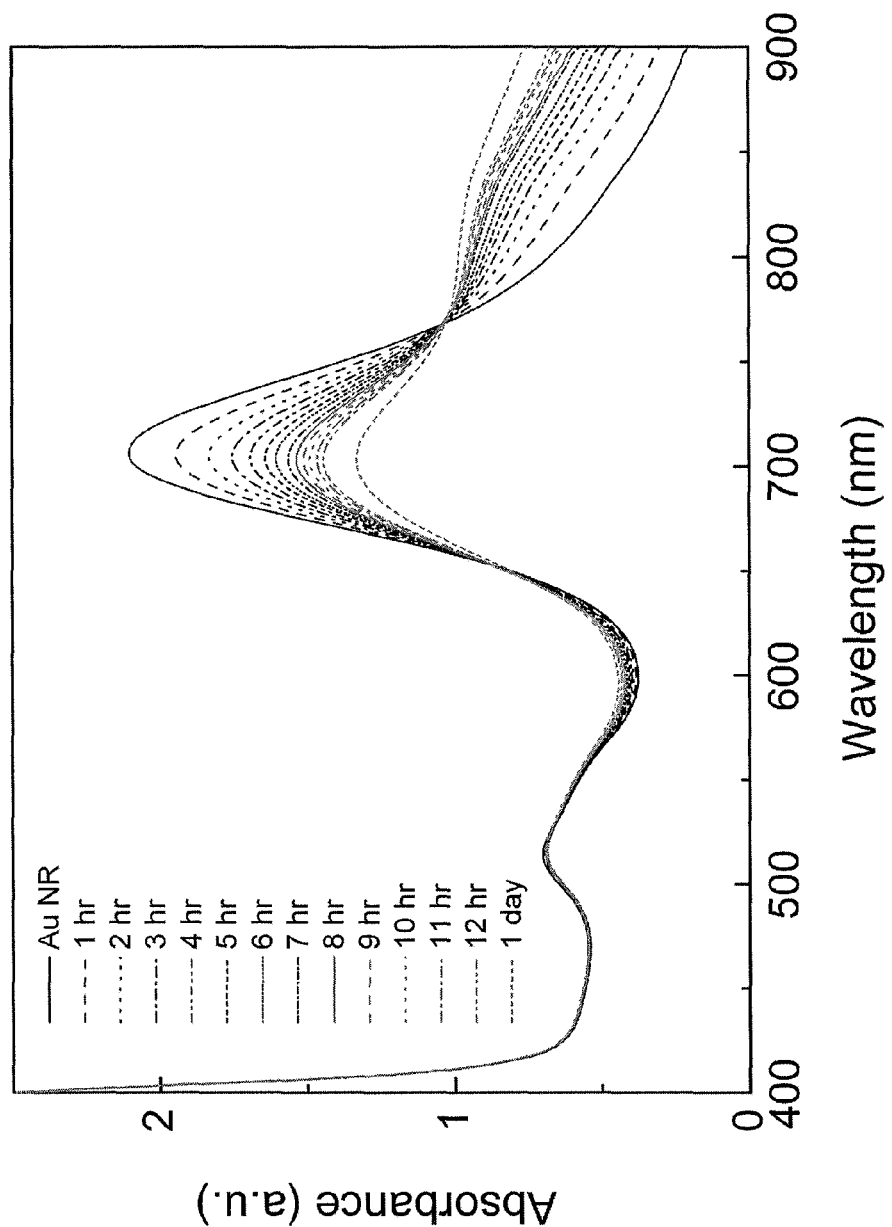
FIG. 12 shows the time evolution of the absorption spectrum of an Au NR solution after DSCG was added to start the end-to-end assembly according to an embodiment of the invention.

End-to-end self assembly of Au NRs with CTAB and PAA coatings was induced by 0.1 M DSCG added to 2 nM Au NR solution in water in 1:1 proportion. TEM images of the end-to-end chains were taken about 6 hours (FIGS. 8 and 9) and 24 hours (FIG. 10) after the mixture preparation. FIG. 11 schematically represents the end-to-end assembly of Au NRs 111 with CTAB and PAA coatings induced by the addition of DSCG 112. FIG. 12 shows the time evolution of the absorption spectrum of the Au NR solution after 0.1 M DSCG was added to start the end-to-end assembly.

It is believed that the mode of NR assembly can be controlled by their surface charge, which changes interactions with DSCG. Used in the example were Au NRs coated first with CTAB and then with PAA to make them negatively charged. 1 ml of 0.2 M DSCG solution was added to 1 ml solution of these NRs and triggered end-to-end fashion (FIGS. 8-12). TEM shows that the NRs are connected end-to-end, with a small lateral shift, caused by the prismatic geometry of the ends with tilted {111} triangular facets.

Spectroscopic data show that after DSCG was added, the amplitude of the longitudinal peak, centered at 706 nm for isolated NRs, gradually decreases over time, and concomitantly a new peak located at a longer wavelength emerges and increases its amplitude (see FIG. 12). The spectra show a behavior with a characteristic isosbestic point at 770 nm. For chains of NRs, one expects that the longitudinal peak is located at longer wavelengths (as compared to the peak 706 nm for isolated NRs); the transverse peak centered at 514 nm should remain unaffected, in agreement with other known experiments and calculations.

The plausible mechanism of end-to-end assembly is the difference in charge characteristics of the lateral surface and the end facets of the NRs. The negatively charged PAA binds easily to the CTAB bilayer at the lateral side of the NRs, but not to the end facets deprived of CTAB. These end facets are likely to be preferred locations for the strongly negatively charged DSCG stacks, which might also have strong van der Waals attraction to Au due to the aromaticity of DSCG, as illustrated in FIG. 11. Heating to 70° C. did not bring any changes in the absorption spectra, thus demonstrating an excellent thermostability of the linking agent as compared to currently available protein-based and DNA-based agents.

Example 3

Quench Gold NR Assembly by Polymer Coating

A key challenge in producing the NR assemblies is to control their size, because the size of the assembled NR structures increases with time, resulting in giant clusters that eventually precipitate. In this Example, the growth of chromonic-mediated side-by-side NR assemblies was arrested by using polyelectrolytes.

Figure 13:
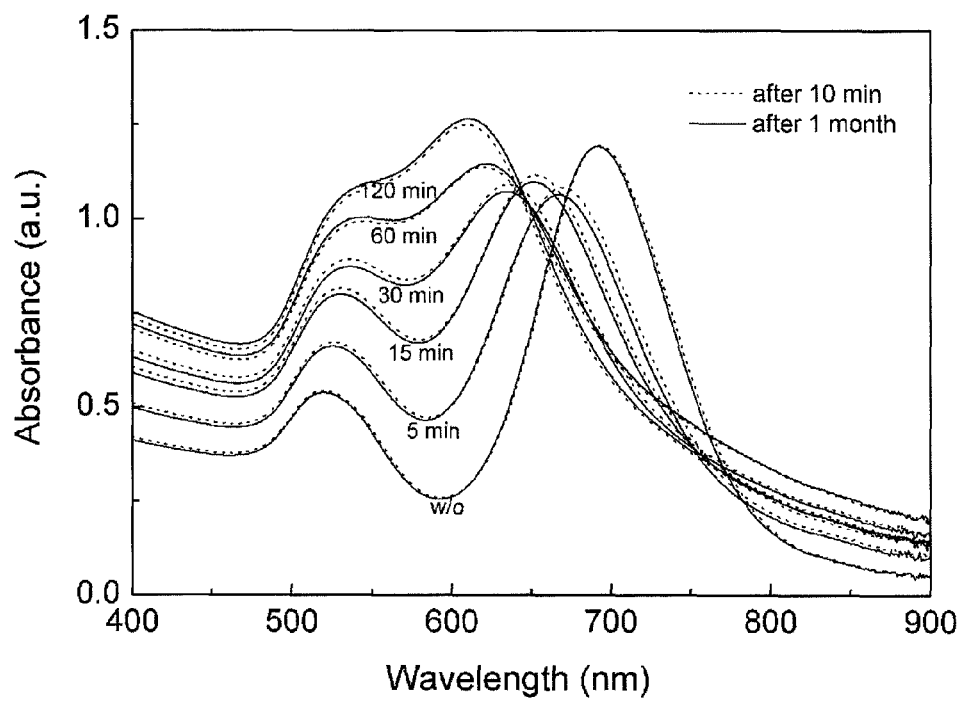
FIG. 13 shows the absorption spectra of the assembled NR structure with the addition of 1% poly(sodium styrenesulfonate) (PSS) solution at different reaction times.

In preparing a solution of NRs and DSCG similar to Example 1, 1% of PSS solution was added to the NR solution in the ratio of 1:4 at 0, 5, 15, 30, 60 and 120 minutes after DSCG was added. After the addition of the polyelectrolyte, the longitudinal and transverse plasmon peaks stopped shifting. After removing the excess polymer and DSCG by centrifugation, the resulting NR solutions demonstrate "arrested" spectral features that are stable for a period of at least one month, as shown in FIG. 13. FIG. 13 is the absorption spectra of the assembled NR structure with the addition of a 1% PSS solution at different reaction times. A control sample without DSCG is labeled as "w/o". It appeared that the plasmon peaks from the solutions quenched by PSS coating did not change for a period of up to one month.

Figure 14:
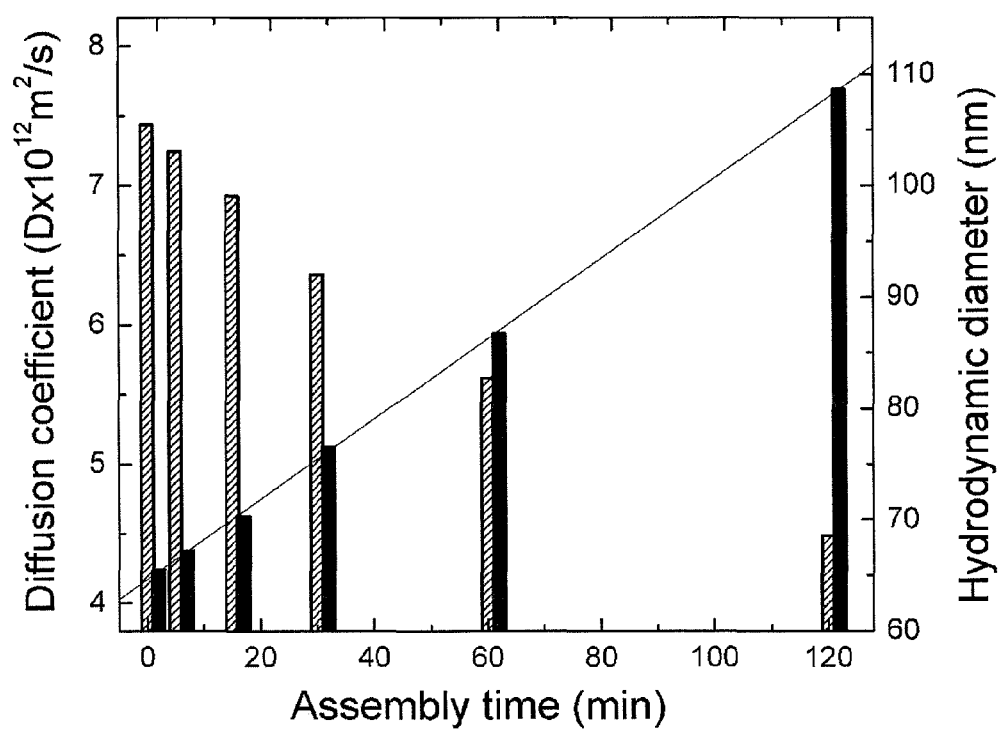
FIG. 14 shows the dynamic light scattering (DLS) data in terms of diffusion coefficients and hydrodynamic diameters obtained from the addition of PSS at different stages of DSCG-triggered assembly of NRs.

Dynamic light scattering (DLS) experiments demonstrated that the addition of PSS at different stages of the DSCG-triggered assembly of NRs resulted in different average size of the "arrested" aggregates. As shown in FIG. 14, PSS was added to the NR solutions either simultaneously with DSCG (zero "assembly time" in FIG. 14) or at time 5, 15, 30, 60, and 120 minutes after the addition of DSCG. The diffusion coefficients decrease with reaction time, while the hydrodynamic diameters increase with reaction time. The effective diffusion coefficients ($D_{trans}$) for the NR structures show a dramatic decrease as the assembly time (NRs exposed to DSCG but not to PSS) increases. The effective hydrodynamic diameter ($d_{hydrodynamic}$) of assembled structures, which was roughly estimated using the below Stokes-Einstein equation for spherical particles, increases practically linearly from about 65 nm to about 110 nm as a function of the "assembly time", as shown in FIG. 14.

$$d_{hydrodynamic} = k_B T / 3\pi \eta D_{trans}$$

Example 4

Polymer Composite of Assembled NR

Figure 15:
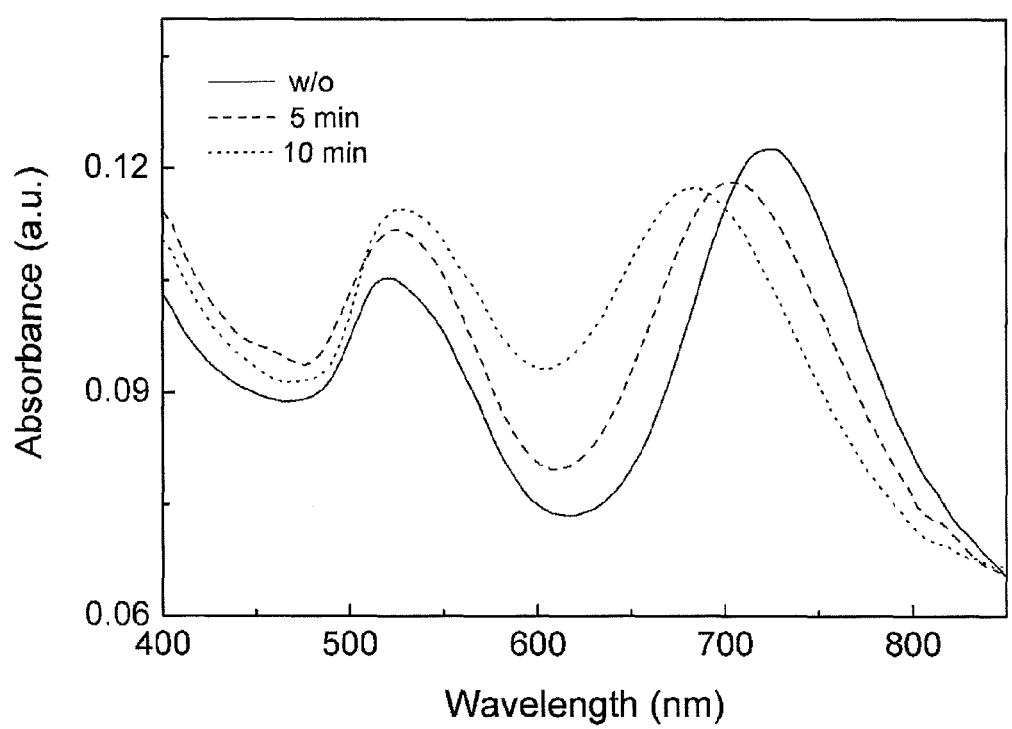
FIG. 15 shows the absorption spectra of composite films prepared from adding a PVA solution in water to NR solutions arrested with PSS.

To utilize and further modify the unique properties of the assembled NR structures, they were embedded in a polymer matrix. In this Example, a NR-PVA polymer composite film was prepared by transferring side-by-side assembled NRs (similar to Example 1) from the water solution. Three different NR solutions were prepared, and all were quenched by adding PSS. The first solution comprised isolated CTAB-functionalized NRs (no DSCG), and the second and third comprised NR solutions with DSCG and assembly times of 5 min and 15 min, respectively. The solutions arrested with PSS were added to a 10 wt % PVA solution in water. After water evaporation, films with embedded NR structures were formed. Their spectral properties are similar to those of side-by-side assembled structures in water, as shown in the absorption spectra of FIG. 15. Because the dielectric permittivity of PVA is much smaller than that of water, the plasmon peaks for the NR-PVA composite film were red shifted as compared to the plasmon peaks for the water solution. With reference to FIG. 15, the UV-vis spectra of the composite films with assembled NR structures show that the longitudinal plasmon peaks still have a blue shift (towards the shorter wavelengths) and the transverse peaks have a red shift (towards the longer wavelength), which means the assembled structures are preserved in the polymer medium.

The invention also provides a device including the composition as described above. In such a device, the subject composition may be disposed in the device or between actuating members such as electrodes to perform a selected function, or may serve as a structure or a vehicle to perform a selected function. Examples of such devices include, but are not limited to, a cloaking device, a biological sensing device, a drug delivery device, a meta material, a negative index material, an enhanced imaging device, a device for solar energy conversion, and the like, and any combination thereof.

In various embodiments, the applications of nanorods are diverse, ranging from display technologies (the reflectivity of the rods can be changed by changing their orientation with an applied electric field) to microelectromechanical systems (MEMS).

The invention further provides a method of assembling nanoparticles comprising using electrically charged self-assembled molecular aggregates to assembly the nanoparticles through an interaction between the electrically charged self-assembled molecular aggregates and the nanoparticles. Similarly, the interaction may be a non-covalent interaction, such as an anisotropic electrostatic interaction. The electrically charged self-assembled molecular aggregates may comprise lyotropic chromonic molecules as well.

The invention has been described with reference to the preferred embodiments. Obvious modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A composition comprising:
   nanoparticles; and
   electrically charged non-covalently self-assembled molecular aggregates;
   wherein said nanoparticles are assembled into a side-by-side orientation through a non-covalent interaction with said electrically charged non-covalently self-assembled molecular aggregates;
   wherein the electrically charged self-assembled molecular aggregates comprise lyotropic chromonic molecules; and
   wherein the concentration of the lyotropic chromonic molecules is in the range of from greater than 0.1 mM to 20 mM.

2. The composition according to claim 1, in which the interaction comprises an anisotropic electrostatic interaction.

3. The composition according to claim 1, in which the nanoparticles have an anisotropic property.

4. The composition according to claim 3, in which the anisotropic nanoparticles comprise nanorods.

5. The composition according to claim 4, in which the nanorods comprise Gold nanorods.

6. The composition according to claim 4, in which the nanorods are positively charged.

7. The composition according to claim 4, wherein the nanorods have an aspect ratio of from about 3 to about 5.

8. The composition according to claim 4, wherein the nanorods are coated with hexadecyltrimethylammonium bromide.

9. The composition according to claim 1, in which the lyotropic chromonic molecule has a disc-like shape and comprises a polyaromatic core and one or more ionizable groups at the periphery of the polyaromatic core.

10. The composition according to claim 1, in which the lyotropic chromonic molecules are self-assembled into a polydisperse stack.

11. The composition according to claim 1, wherein the concentration is in the range of from 0.4 mM to 0.8 mM.

12. The composition according to claim 11, wherein the nanoparticles are gold nanorods.

13. The composition according to claim 11, wherein lyotropic chromonic molecules comprise disodium chromoglycate (DSCG).

14. The composition according to claim 11, wherein the nanoparticles are coated with hexadecyltrimethylammonium bromide.

15. A composition comprising:
nanoparticles; and
electrically charged self-assembled molecular aggregates, in which the electrically charged self-assembled molecular aggregates comprise lyotropic chromonic molecules, in which the lyotropic chromonic molecules comprise disodium chromoglycate (DSCG);
wherein the concentration of the disodium chromoglycate is in the range of from greater than 0.1 mM to 20 mM; and
wherein said nanoparticles are assembled through an interaction with said electrically charged self-assembled molecular aggregates.

16. The composition according to claim 15, wherein the concentration is in the range of from 0.4 mM to 0.8 mM.

17. The composition according to claim 16, wherein the nanoparticles are gold nanorods.

18. The composition according to claim 16, wherein lyotropic chromonic molecules comprise disodium chromoglycate (DSCG).

19. The composition according to claim 16, wherein the nanoparticles are coated with hexadecyltrimethylammonium bromide.

20. A polymer composite comprising:
a polymer matrix; and
a composition comprising nanoparticles and electrically charged non-covalently self-assembled molecular aggregates;
wherein said nanoparticles are assembled into a side-by-side orientation through a non-covalent interaction with said electrically charged non-covalently self-assembled molecular aggregates;
wherein the electrically charged self-assembled molecular aggregates comprise lyotropic chromonic molecules;
wherein the concentration of the lyotropic chromonic molecules is in the range of from greater than 0.1 mM to 20 mM; and
wherein assemblies of the nanoparticles are dispersed in the polymer matrix.

21. The polymer composite according to claim 20, wherein the assemblies of nanoparticles comprise assemblies of nanorods, and the polymer matrix comprises poly(vinyl alcohol).

22. A device including a composition which comprises:
nanoparticles; and
electrically charged self-assembled molecular aggregates;
wherein said nanoparticles are assembled into a side-by-side orientation through a non-covalent interaction with said electrically charged self-assembled molecular aggregates;
wherein the electrically charged self-assembled molecular aggregates comprise lyotropic chromonic molecules; and
wherein the concentration of the lyotropic chromonic molecules is in the range of from greater than 0.1 mM to 20 mM.

23. The device according to claim 22, which is selected from a cloaking device, a biological sensing device, a drug delivery, a meta material, a negative index material, an enhanced imaging device, and a device for solar energy conversion.

* * * * *